United States Patent [19]
Bohmer et al.

[11] Patent Number: 5,276,115
[45] Date of Patent: Jan. 4, 1994

[54] MONO-1-OLEFIN POLYMERIZATION IN THE PRESENCE OF HYDROGEN AND A CYCLOPENTADIENYL COMPOUND

[75] Inventors: Robert W. Bohmer; M. Bruce Welch; Kenneth L. Anderson, all of Bartlesville, Okla.

[73] Assignee: Phillips Petroleum Company, Bartlesville, Okla.

[21] Appl. No.: 990,155

[22] Filed: Dec. 14, 1992

[51] Int. Cl.$^5$ .................... C08F 4/649; C08F 2/38; C08F 10/02

[52] U.S. Cl. .................... 526/126; 526/65; 526/128; 526/159; 526/169; 526/348.5; 526/903; 526/905; 525/53; 525/245; 525/254

[58] Field of Search ............... 526/308, 283, 903, 905, 526/128, 126, 90, 159, 169, 348.5, 65; 525/290, 297, 53, 245, 254

[56] References Cited

U.S. PATENT DOCUMENTS 3,294,766 12/1966 Henderson et al. ............ 526/905 X
4,015,059 3/1977 Karol .................................. 526/130

OTHER PUBLICATIONS

Ziegler-Natta Catalysts and Polymerizations, pp. 251-256, (Academic Press 1979).

Primary Examiner—Fred Teskin
Attorney, Agent, or Firm—Marianne H. Michel

[57] ABSTRACT

A process for the polymerization of olefins in the presence of hydrogen comprising contacting the olefin, a cyclopentadienyl compound and a catalyst comprising a transition metal compound at polymerization conditions.

13 Claims, No Drawings

MONO-1-OLEFIN POLYMERIZATION IN THE PRESENCE OF HYDROGEN AND A CYCLOPENTADIENYL COMPOUND

BACKGROUND OF THE INVENTION

The invention relates to a method of polymerizing olefins.

In many circumstances, it is desirable to reduce the hydrogen effect in the presence of olefins in certain polymerization processes. When hydrogen is employed to produce polymers having low molecular weight, the hydrogen must be removed before producing high molecular weight polymer in the same reactor. In a commercial operation this is time consuming and expensive. Transition times of greater than 24 hours may be required.

When producing polymer, it is often desirable to incorporate comonomer exclusively in a high molecular weight component of the polymer. When using reactors in series, a low molecular weight polymer can be produced in a first reactor in the absence of comonomer. High molecular weight polymer can be produced separately in second reactor where comonomer is incorporated.

When using Ziegler type catalyst systems, very high concentrations of hydrogen are required to produce the low molecular weight component. However, hydrogen is detrimental to the production of high molecular weight polymer, and it is necessary that hydrogen be removed before high molecular weight polymer containing copolymer can be produced. If two reactors are employed, an intermediate separation facility between reactors is required. If a single reactor is employed, a very long transition time between polymerizations is required. These processes are expensive, mechanically complicated and perhaps infeasible with loop reactor technology.

SUMMARY OF THE INVENTION

An object of this invention is to provide improved polymerization processes in which the effect of hydrogen present in such process is decreased.

In accordance with the invention at least one olefin is contacted with a cyclopentadienyl compound and a catalyst comprising a transition metal compound in the presence of hydrogen under polymerization conditions.

DETAILED DESCRIPTION OF THE INVENTION

Cyclopentadienyl compounds suitable for use in the present invention include cyclopentadiene, dicyclopentadiene, or cyclopentadienyl compounds substituted with a hydrocarbyl radical or hydrocarbylsilyl radical. Generally, the hydrocarbyl radical or hydrocarbylsilyl radical of the substituted cyclopentadiene would contain from 1 to 10 carbon atoms. The hydrocarbyl radical or hydrocarbylsilyl radical can be saturated or unsaturated, and can include aliphatic, alicyclic and aromatic radicals such as methyl, ethyl, propyl, butyl, pentyl, cyclopentyl, cyclohexyl, allyl, phenyl and naphthyl radicals. Preferably the hydrocarbyl radical is an alkyl containing from 1 to 4 carbon atoms. Some specific examples of cyclopentadienyl compounds include cyclopentadiene, ethylcyclopentadiene, trimethylcyclopentadiene, trimethylsilylcyclopentadiene, and pentamethylcyclopentadiene. Currently cyclopentadiene is preferred.

The amount of cyclopentadienyl compound can vary over a broad range. Generally, the cyclopentadienyl compound is present in an amount in the range of from about 0.01 moles to about 100 moles per mole of catalyst, and preferably from 0.1 moles to 50 moles per mole of catalyst.

Suitable catalysts that can be employed include Ziegler-natta type catalysts known in the art. Such catalysts contain transition metal compounds and include those containing titanium, zirconium, and/or vanadium. Catalysts containing titanium compounds, such as titanium halides, are preferred. Examples of suitable catalysts are described in detail in patents U.S. Pat. Nos. 4,326,988; 4,394,291; 4,325,837; and 4,562,168 which are herein incorporated by reference. Although not required, organometallic cocatalysts disclosed in the above identified patents can also be employed.

A variety of olefin compounds are suitable for use in the process of the present invention. Olefins which can be employed include aliphatic mono-1-olefins. While the invention would appear to be suitable for use with any aliphatic mono-1-olefin, those olefins having 2 to 18 carbon atoms are most often used. Ethylene is preferred. Often a second mono-1-olefin (comonomer) having from 2 to 12 carbon atoms, preferably from 4 to 10 carbon atoms can be employed. Butene, pentene, hexene, and heptene are currently preferred and 1-hexene is most preferred.

The reaction conditions for contacting the olefin, the cyclopentadienyl compound and the catalyst can vary broadly depending on the olefin employed, and are those sufficient to polymerize the mono-1-olefins. Generally the temperature is in the range of about 20° C. to about 200° C. and the pressure is in the range of from about 0.5 MPa to about 5.0 MPa (70–725 psi).

The polymerization processes according to the present invention can be performed either batchwise or continuously. The polymerization processes can be conducted in a single reactor or in series reactors. In a batch process, for example, a stirred autoclave is prepared by first purging with nitrogen and then with a suitable compound, such as isobutane for example. When a catalyst and a cocatalyst are employed either can be charged to the reactor first or they can be charged simultaneously. After closing the entry port, a diluent such as isobutane is added to the reactor. The reactor is heated to the desired reaction temperature. Olefin, such as ethylene, is then admitted and maintained at a partial pressure within a range of from about 0.5 MPa to about 5.0 MPa (70–725 psi) for best results. At the end of the designated reaction period, the polymerization reaction is terminated and the unreacted olefin and isobutane can be vented. The reactor can be opened and the polymer can be collected as a free-flowing white solid and dried to obtain the product.

The mono-1-olefins can be polymerized according to the present invention employing either a slurry process, a solution form process, or a gas phase process. The olefin, the catalyst, and the cyclopentadienyl compound can be contacted in any order. The present invention has been found to be particularly effective for polymerization of ethylene.

In a continuous process a suitable reactor such as a loop reactor is continuously charged with suitable quantities of solvent or diluent, catalyst, cocatalyst, polymerizable compounds and cyclopentadienyl compound, and in any desirable order. The reaction product can be continuously withdrawn and the polymer recovered as appropriate, generally by flashing the diluent (solvent) and unreacted monomers and drying the resulting polymer.

The inventive process is especially well suited for use in series reactors to produce copolymers with comonomer incorporated exclusively in the high molecular weight component. Monomer, catalyst, and hydrogen can be introduced into the first reactor to produce a low molecular weight polymer. Low molecular weight polymer from the first reactor, monomer, comonomer, catalyst, and cyclopentadienyl compound can be introduced into the second reactor without prior removal of remaining hydrogen. The response to any residual hydrogen is minimized or inhibited in the presence of a cyclopentadienyl compound. Thus polymer containing comonomer in the high molecular weight component is produced.

The process of the invention is also useful for sequentially preparing isolated polymers having widely different molecular weights in the same reactor. Such polymers can be used to produce blends with exceptional balance of processability, stress cracking resistance, and stiffness. Under normal operations an extended transition time would be required to transition between these polymers. Use of cyclopentadienyl compounds eliminates the need for such extended transition times. For example a low molecular weight polymer may require up to 2 mole percent hydrogen. A high molecular weight polymer requires as little as 0.01 to 0.05 mole percent hydrogen. The use of a cyclopentadienyl compound can reduce the transition time between polymerizations of low molecular weight polymers and high molecular weight polymers from 24 hours to less than 5 hours.

The olefin polymers made with this invention are useful in preparing articles by conventional polyolefin processing techniques such as injection molding, rotational molding, extrusion of film, pipe extrusion, and blow molding.

The following example will serve to show the present invention in detail by way of illustration and not by way of limitation.

EXAMPLE

The following example demonstrates the effect of cyclopentadiene on the molecular weight of polyethylene polymer produced using a titanium catalyst and in the presence of hydrogen.

The catalyst used in the polymerization reactions was prepared in a 100 gallon glass lined Pfaudler reactor equipped with stirrer. The reactor was purged with nitrogen and charged with 50 gallons n-hexane, 13.7 lbs (6.2 Kg) magnesium dichloride, and 60 lb titanium tetraethoxide. The reactor was heated to 100° C. and held for 1 hour while mixing. The reactor was cooled to 26° C. and 132 lbs ethylaluminum dichloride was added over a period of 1 hour. The temperature ranged from 29°-32° C. during the precipitation. The liquid portion was decanted and the solids were washed with 50 gallons n-hexane, and then with 40 gallons n-hexane. The final wash was under 20 psig pressure. Then 40 gallons n-hexane and 40 lbs ethylaluminum dichloride were added to the reactor, followed by 1.8 lbs ethylene. The temperature was increased to about 37° C. and the mixture stirred for 30 minutes. The reactor was purged 3 times with nitrogen. The liquid was decanted and the solids were washed twice with 33 gallons n-hexane. Then 33 gallons of n-hexane and 36 lbs of titanium tetrachloride were added to the reactor and the mixture was stirred for 30 minutes. The solids were washed with a 50 gallon n-hexane wash, followed by four 40 gallon n-hexane washes. The slurry catalyst thus produced was diluted in heptane.

The polymerization reactions were conducted in a 1-gallon stirred autocalve reactor. Cocatalyst and catalyst were charged to a dry reactor under counter flow of ethylene at ambient temperature. The reactor was charged with 0.50 mL 15% triethylaluminum cocatalyst, a predetermined amount of catalyst slurry, and 2 liters isobutane. A predetermined amount of cyclopentadiene diluted in n-heptane was added in Runs 102-104. The temperature was increased to about 100° C. and hydrogen and ethylene were admitted. The partial pressure of hydrogen was 132 psig measured as the pressure drop in a 2250 mL vessel. The partial pressure of ethylene was 71.5 psi and total reactor pressure was 500 psig. The reaction temperature and pressure were maintained for 1 hour. The solvent was then removed and the polymer collected as a dry fluff. The results employing varying amounts of cyclopentadiene and catalyst are represented in Table 1.

In the following table, Cp is ppm cyclopentadiene in the isobutane. Catalyst is the mg of catalyst employed. MI is melt index, in g/10 minutes, measured according to ASTM D1238-65T, condition E. HLMI is high load melt index, g/10 minutes, ASTM D1238-65T, condition F.

TABLE I

| Run | Cp ppm | Catalyst mg | MI g/10 min |
|---|---|---|---|
| 101 | 0 | 23 | 448 |
| 102 | 0.08 | 8.4 | 282 |
| 103 | 0.67 | 4.5 | 109 |
| 104 | 2.4 | 5.0 | *1.1 |

*HLMI

Table I demonstrates the effect of cyclopentadiene on the hydrogen response, i.e. a decrease in melt index proportional to the amount of cyclopentadiene added.

While this invention has been described in detail for the purpose of illustration, it is not to be construed as limited thereby, but is intended to cover all changes and modification within the spirit and scope thereof.

That which is claimed is:

1. A process comprising contacting at least one mono-1-olefin, a catalyst, and hydrogen in a first step to produce a first polymer;

wherein said catalyst comprises a transition metal compound and wherein the transition metal of said transition metal compound is selected from the group consisting of titanium, zirconium, and vanadium; and contacting said at least one mono-1-olefin, said catalyst, and a cyclopentadienyl compound in a second step to produce a second polymer;

wherein said cyclopentadienyl compound is selected from the group consisting of cyclopentadiene, dicyclopentadiene and cyclopentadienyl compounds substituted with hydrocarbyl or hydrocarbyl silyl radicals having from 1 to 10 carbon atoms; and wherein said contacting in said first step and said second step is under polymerization conditions.

2. A process according to claim 1 further comprising contacting at least one mono-1-olefin comonomer in said second step.

3. A process according to claim 2 wherein said comonomer is 1-hexene.

4. A process according to claim 1 wherein said first step is conducted in a first reactor and said second step is conducted in a second reactor connected in series with said first reactor.

5. A process according to claim 1 wherein said cyclopentadienyl compound is cyclopentadiene.

6. A process according to claim 1 wherein said cyclopentadienyl compound is present in an amount in the range of from about 0.01 moles to about 100 moles cyclopentadienyl compound per mole of catalyst.

7. A process according to claim 1 wherein said at least one mono-1-olefin is ethylene.

8. A process according to claim 1 wherein said polymerization conditions include a temperature in the range of about 20° C. to about 200° C. and a pressure of about 0.5 MPa to about 5.0 MPa.

9. A polymerization process comprising:
 (1) contacting ethylene monomer, a catalyst comprising a titanium compound, and hydrogen under polymerization conditions to produce a first ethylene polymer; and
 (2) contacting ethylene monomer, said catalyst, and cyclopentadiene under polymerization conditions to produce a second ethylene polymer.

10. A process according to claim 9 wherein said cyclopentadiene is present in said second step in an amount within the range of from 0.1 moles to 50 moles per mole of catalyst.

11. A process according to claim 9 further comprising contacting 1-hexene in said second step.

12. A process according to claim 9 wherein said polymerization conditions in step (1) and step (2) include a temperature in the range of 50° C. to 150° C.

13. A process according to claim 9 wherein step (1) is conducted in a first reactor and step (2) is conducted in a second reactor connected in series with said first reactor.

* * * * *